United States Patent [19]
Williams et al.

[11] Patent Number: 5,242,144
[45] Date of Patent: Sep. 7, 1993

[54] LATCH SYSTEM SEAT SUPPORT ASSEMBLY

[75] Inventors: Mitchell N. Williams, Melvindale; Donald R. Brasie, Dearborn; Finney J. Allen, Jr., Trenton, all of Mich.

[73] Assignee: Ford Motor Company, Dearborn, Mich.

[21] Appl. No.: 763,713

[22] Filed: Sep. 23, 1991

[51] Int. Cl.5 ............................................ F16M 13/00
[52] U.S. Cl. ................................................... 248/429
[58] Field of Search ............... 248/429, 430, 419, 424, 248/425; 297/346, 344, 341

[56] References Cited
U.S. PATENT DOCUMENTS
4,961,559 10/1990 Raymor .

FOREIGN PATENT DOCUMENTS
754290 8/1956 United Kingdom ................ 248/429

Primary Examiner—Alvin C. Chin-Shue
Attorney, Agent, or Firm—Daniel M. Stock; Clifford L. Sadler

[57] ABSTRACT

A seat support assembly includes a double latch assembly for the seat that ensures that one side latches without regard to the condition of the other side where both are operated by a U-shaped lift bar actuator.

7 Claims, 3 Drawing Sheets

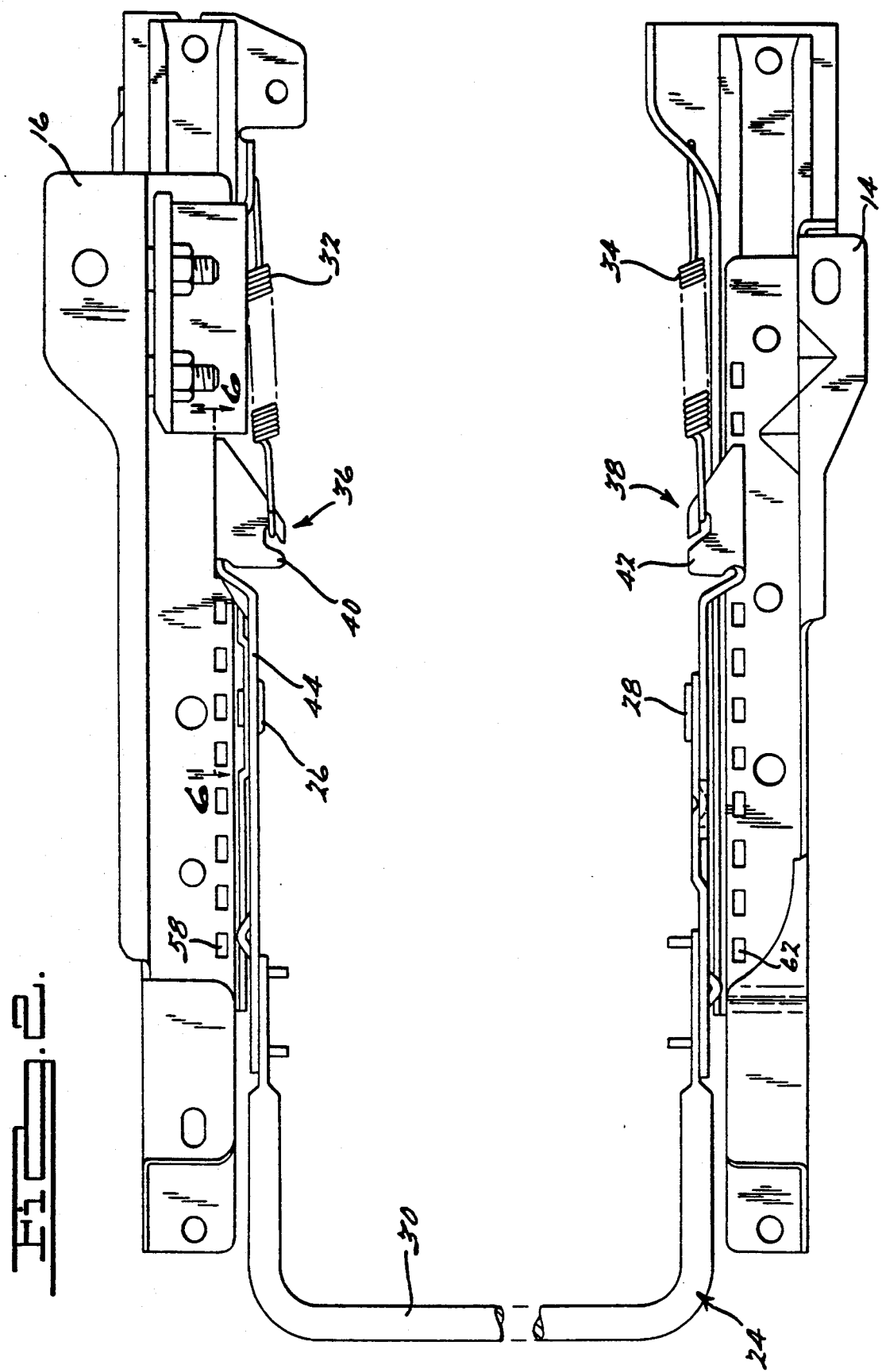

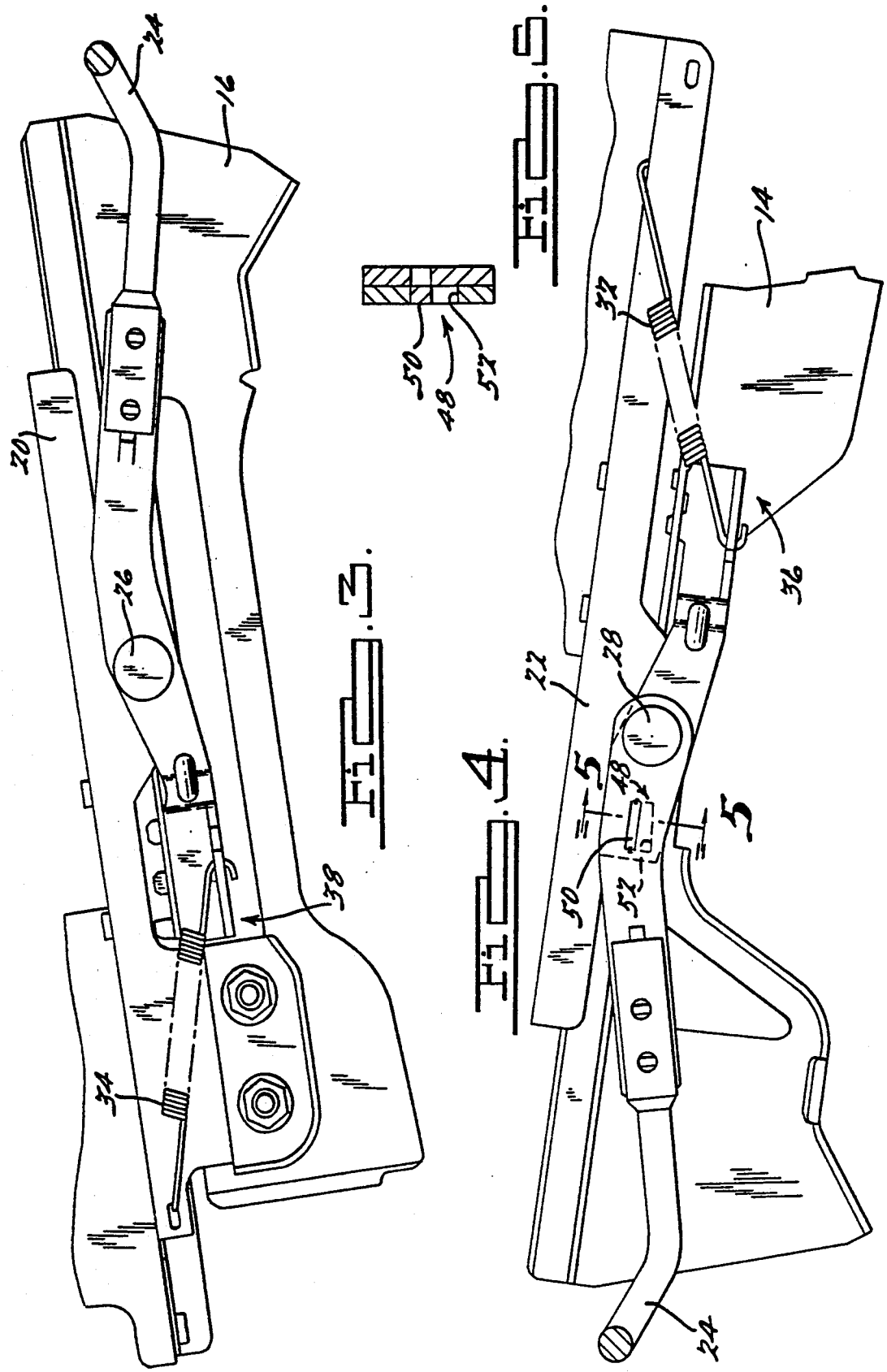

LATCH SYSTEM SEAT SUPPORT ASSEMBLY

BACKGROUND OF THE INVENTION

The present invention relates generally to seats for automobiles, and more particularly to latching arrangements for controlling longitudinal movement of such seats.

Dual locking arrangements for fixing the relative movement between sliding seat tracks are well known in the prior art. Exemplary of such arrangements is that shown in U.S. Pat. No. 4,961,559. These arrangements attempt in various ways to overcome problems associated with misalignment between inboard and outboard sliding tracks of the seat that is the result of the stack-up of manufacturing tolerances. The disclosed seat structure and others suffer from disadvantages that make their use less than optimal. Chief among these disadvantages is the dependence upon compensating longitudinal travel of the laterally spaced seat tracks to effect locking engagement on both sides. The prior art seats also suffer from the disadvantage that when misalignment results in one latching member effecting a lock before the other, the sequence is random, making it difficult to optimize the design of the components associated with restraining seat longitudinal movement. Decreasing the sensitivity to misalignments in longitudinal positioning in the seat tracks is accordingly a goal of such designs. The seat design of the mentioned patent suffers from the further disadvantage that its locking action is dependent upon the indirect action of two independently pivotally mounted members.

SUMMARY OF THE INVENTION

According to the present invention, a latch system for a longitudinally movable automotive seat is provided that employs a U-shaped release bar mechanism pivotally mounted to the fixed track of a seat track system which has a primary locking Portion which is directly pivotally moved into and out of engagement about the axis of a pivot pin joining the release bar to the seat track, and a secondary locking portion that is connected to the release bar through a lost motion mechanism positioned proximate the other free end of the release bar and spaced from its pivotal connection to the seat track.

The latching system of the seat support of the present invention further advantageously uses a tooth locking structure for the primary and secondary latches which includes a longer tooth form for the primary locking member than for the secondary. The primary locking member is effective to hold the seat fast against longitudinal movement, but as the secondary locking member moves toward engagement independent of the primary locking member, its pivotal movement into locking engagement is facilitated by its shorter tooth form. The arrangement also ensures that the primary latching member engages before the secondary.

BRIEF DESCRIPTION OF THE DRAWINGS

These and other advantages will be compared to those skilled in the automotive seating arts upon reading the following description of the invention with reference to the accompanying drawings in which:

FIG. 2 is a bottom view of the seat support of FIG. 1 in the direction of the arrow II—II.

FIG. 3 is a side view of the support structure according to the present invention taken along the direction of arrow III—III in FIG. 1.

FIG. 4 is a side view of the support structure according to the present invention taken along the direction of arrow IV—IV.

FIG. 5 is a cross-section taken along lines V—V of FIG. 4.

DESCRIPTION OF THE PREFERRED EMBODIMENT

Figure 1:
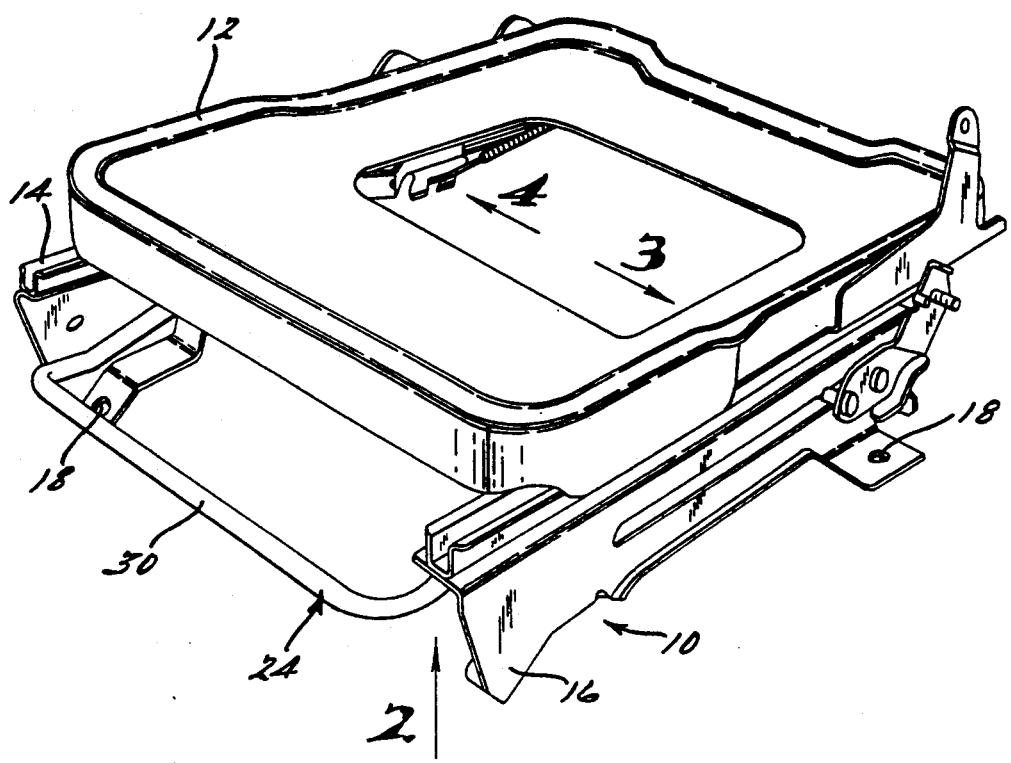
FIG. 1 is a perspective view of a seat support structure according to the present invention.

Turning now to the drawings and in particular to FIG. 1, a seat support structure 10 is illustrated as comprising a generally horizontal seat portion 12, a pair of stationary seat tracks 14, 16 adapted to be fixedly secured to the floor of a vehicle as through a fastener aperture, such as indicated at 18. A pair of movable seat tracks 20, 22 are carried on the underside of the seat 12 and cooperate in channel-like sliding engagement with the tracks 14, 16 in a well-known manner. A U-shaped release bar 24 is pivotally connected as indicated at 26, 28 to the seat tracks 20, 22 and includes a bridging handle portion 30. Extension springs 32, 34 engage the free ends 36, 38 (generally) of the U-shaped release bar 24 to urge it toward the locking position shown in FIGS. 3 and 4.

A primary locking portion 40 is formed at one end 36 while a secondary locking portion 42 is carried on the other end 38. The primary locking portion 40 is an integral part of the arm 44 of the U-shaped release bar 24, while the secondary locking portion 42 is an articulated member, pivotally mounted on the pin 28 and drivingly engaged by the arm 46 through lost motion slot 48, as may best be seen in FIGS. 4 and 5. A struck-out tab 50 on the secondary locking member 42 is movable between the limits of a slot 52 formed in a portion of the arm 46. Within the limits of movement within the slot 52, the secondary locking member 42 is free to abutingly engage outer surface 54 of the track when the primary locking member 40 is fully engaged, as may best be seen in FIG. 6 by insertion of teeth 56 formed on the primary locking member 40 into apertures 58 formed through the track 16.

Figure 6:
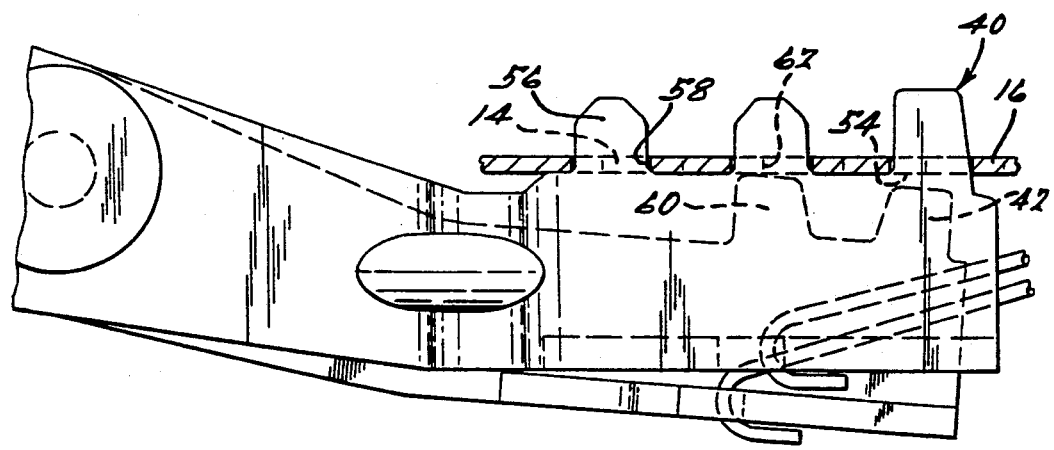
FIG. 6 is a side view partially in section illustrating the cooperative locking arrangement of the primary and secondary locking members.

It will be noted that teeth 60 of the secondary locking member 42 are formed shorter than the teeth 58 of the primary locking member 40 and are fewer in number, two as opposed to three, as shown in FIG. 6. This disparity in height and number has been found to allow the spring 32 to drive the secondary locking member 42 into engagement with aperture 62 formed through the track 16 with less relative longitudinal movement between the movable and fixed tracks than would be experienced if locking teeth were of the same configuration and arrayed in the same number. This asymmetric arrangement together with the selected size relationship between the tab 50 and the slot 52 also ensures that the primary locking portion 40 rides on the surface of the fixed track as it moves between latched positions while the secondary locking locking portion 42 remains upwardly spaced with respect to the track. This assures that the primary locking portion 40 will always latch before the secondary locking portion 42, permitting seat designers to predict and manage seat loading by assuring that longitudinal loads will pass through the latched connection.

The seat 12 may be adjusted in fore and aft direction by pulling the left bar handle 30 up to pivot the primary and secondary locking portions 40, 42 out of engagement with the apertures 58, 62 of the stationary tracks 14, 16. As the seat 12 is moved with the tracks 20, 22 and the release bar 24, the teeth 56 of primary locking portion 40 may register with apertures 58 of track 14. Release of the handle 30 will lock the seat 12 against further movement while the teeth 60 of secondary locking portion 42 may remain out of engagement with apertures 62 independent of the position of teeth 56 because of the pivotal freedom the lost motion slot 48 provides. Teeth 56 will not engage apertures 62 if the teeth 56 do not engage the apertures 58. That pivotal freedom accommodates for variations in the longitudinal positioning of laterally opposed pairs of apertures 58, 62, as may best be seen in FIG. 6. The use of two shorter teeth 60 in the secondary locking portion increases the range of axial offset between pairs of apertures that can be accommodated while effecting locking engagement of both locking Portions 40, 42.

While only one embodiment of the seat support structure of the present invention has been described, those skilled in the automotive seating arts will appreciate that others may be possible without departing from the scope of the present invention.

We claim:

1. A seat support assembly for an automotive vehicle comprising:
   a first pair of elongated seat track laterally spaced with respect to the longitudinal centerline of the vehicle, fixedly secured to the vehicle and extending parallel to the longitudinal centerline of the vehicle;
   a second pair of elongated seat tracks fixedly secured to the seat and longitudinally slidably engageable with the first seat tracks to permit fore and aft horizontal movement of the seat between a plurality of positions;
   one of said pairs of tracks being movable and having a plurality of longitudinally spaced apertures formed therein;
   a U-shaped lift bar having arms pivotally connected intermediate their ends to each of the other of said tracks and having a pair of operative free ends to register with said one pair of track;
   a primary locking portion formed on one free end of said lift bar, comprising a plurality of teeth having a predetermined height and lockingly engageable with said apertures on one of said movable tracks to prevent relative longitudinal movement between the tracks;
   a secondary locking portion positioned proximate the other free end of said lift bar, comprising a plurality of teeth having a predetermined height substantially less than the height of the teeth of the primary locking portion and lockingly engageable with said apertures of the other of said one pair of tracks; and
   lost motion means interconnecting said secondary locking portion and said lift bar other free end to permit locking engagement of said primary locking portion with said one of said track apertures when said secondary locking portion is disengaged from said other track apertures.

2. A seat support assembly as defined in claim 1, wherein said primary locking portion comprises a greater number of teeth than said secondary locking portion.

3. A seat support assembly as defined in claim 1, wherein said lost motion means includes means operative to prevent engagement of said secondary locking portion teeth with said other track apertures unless said primary locking portion teeth are engaged with said one track apertures.

4. A seat support assembly as defined in claim 1, wherein said lost motion means includes means operative to prevent engagement of said secondary locking portion teeth with said other track apertures unless said primary locking portion teeth are engaged with said one track apertures.

5. A seat support assembly as defined in claim 4, wherein said one of said pairs of tracks comprises said first pair of elongated seat tracks.

6. A seat support assembly for an automotive vehicle comprising:
   a first pair of elongated seat tracks laterally spaced with respect to the longitudinal centerline of the vehicle, fixedly secured to the vehicle and extending parallel to the longitudinal centerline of the vehicle;
   a second pair of elongated seat tracks fixedly secured to the seat and longitudinally slidably engageable with the first seat tracks to permit fore and aft horizontal movement of the seat between a plurality of positions;
   one of said pairs of tracks being movable and having a plurality of longitudinally spaced apertures formed therein;
   a U-shaped lift bar having arms pivotally connected intermediate their ends to each of the other of said tracks and having a pair of operative free ends to register with said one pair of tracks;
   a primary locking portion formed on one free end of said lift bar, comprising a plurality of teeth having a predetermined height and lockingly engageable with said apertures on one of said movable tracks to prevent relative longitudinal movement between the tracks;
   a secondary locking portion positioned proximate the other free end of said lift bar, comprising a plurality of teeth having a predetermined height substantially less than the height of the teeth of the primary locking portion and lockingly engageable with said apertures of the other of said one pair of tracks; and
   means for preventing engagement of said secondary locking portion with said apertures unless said primary locking portion is engaged with said apertures.

7. A seat support assembly as defined in claim 6, wherein said primary locking portion comprises a greater number of teeth than said secondary locking portion.

* * * * *